United States Patent [19]

Miura

[11] Patent Number: 4,542,811

[45] Date of Patent: Sep. 24, 1985

[54] SHOCK ABSORBER

[76] Inventor: Takeshi Miura, Watari, Aza-baba-Machi 55-1, Fukushima-ken, Fukushima-shi, Japan

[21] Appl. No.: 436,711

[22] Filed: Oct. 26, 1982

[30] Foreign Application Priority Data

Sep. 21, 1982 [JP] Japan .............. 57-142915[U]

[51] Int. Cl.$^4$ ............................................. F16F 9/36
[52] U.S. Cl. ................... 188/322.17; 188/315; 277/152
[58] Field of Search ............. 188/322.17, 322.16, 188/322.13, 315, 314, 269, 322.21; 277/24, 37, 152, 153, 181, 182, 183

[56] References Cited

U.S. PATENT DOCUMENTS

| | | | |
|---|---|---|---|
| 3,520,384 | 7/1970 | Nicholls | 188/269 |
| 3,804,217 | 4/1974 | Keijzer | 188/322.17 |
| 4,005,769 | 2/1977 | Itoh | 188/322.17 |
| 4,108,287 | 8/1978 | Kato | 188/315 |

FOREIGN PATENT DOCUMENTS

| | | | |
|---|---|---|---|
| 78834 | 6/1980 | Japan | 188/322.17 |
| 103130 | 8/1980 | Japan | 188/322.17 |

*Primary Examiner*—George E. A. Halvosa
*Assistant Examiner*—Michael P. Gilday
*Attorney, Agent, or Firm*—Holman & Stern

[57] ABSTRACT

A shock absorber capable of effectively preventing a gas from leaking from a gas chamber, maintaining an oil seal in a firmly-held state, and preventing the reciprocating movements of a rod from adversely affecting the function of the oil seal, comprising an oil cylinder and a gas tube, which are joined together in a concentrically-arranged state to form a gas chamber therebetween; a rod, which is moved reciprocatingly in the oil cylinder; a bearing having an axially extending cylindrical support portion and fixed to an end portion of the oil cylinder to form an oil chamber in cooperation with the oil cylinder and rod support in such a manner that the rod can be slidingly moved; and an oil seal, which has a main lip sealingly slidable with respect to a circumferential surface of the rod, and a frustoconical check valve lip resiliently contacting an outer surface of the cylindrical support portion and adapted to allow an oil to flow from the oil chamber to the gas chamber and prevent the oil from flowing in the opposite direction, and the seal is held on the cylindrical support portion as a radially-extending portion, with which the main lip and check valve lip are connected integrally with each other.

3 Claims, 3 Drawing Figures

SHOCK ABSORBER

BACKGROUND OF THE INVENTION

This invention relates to a double cylinder type shock absorber having an oil chamber and a gas chamber, and more particularly to a shock absorber capable of effectively preventing a gas in a gas chamber from leaking therefrom.

In a double cylinder type shock absorber using an oil and a gas and consisting of a combination of a hydraulic means composed of a piston and an oil cylinder and a gas tube provided concentrically on the outer side of the hydraulic means to form a gas chamber therebetween, it is necessary that a means for preventing the leakage of a pressure gas in addition to a seal means for preventing the leakage of a pressure oil be devised. FIG. 1 shows an example of a double cylinder type shock absorber, which is disclosed in Japanese Published Unexamined Utility Model Application No. 1979-53193, and which is provided with seal means of the above-mentioned kind for preventing the leakage of a pressure oil and a pressure gas. This shock absorber has the following constructional elements. Namely, it is provided with a smaller-diameter oil cylinder 1 and a larger-diameter gas tube 2, which are joined together in a concentrically arranged state to form a gas chamber 3 therebetween; a piston (not shown) mounted fixedly on an end portion of a rod 4 and disposed in the oil cylinder 1 in such a manner that the piston can be moved in the axial direction thereof; a bearing 5 adapted to guide the reciprocating movements of the rod 4, fixed to an end portion of the oil cylinder 1, and forming an oil chamber 6 in cooperation with the oil cylinder 1 and rod 4; an oil seal cover 9 supported on an end portion of the gas tube 2; an oil seal 10 consisting of a rubber-like elastic material, disposed on the inner side of the oil seal cover 9, and adapted to preventing an oil from leaking outside and the external dust from entering an inner space on the side of the bearing 5; a check valve 11 consisting of a rubber-like elastic material, having a check valve lip 12 fixed to a washer 13, having a substantially L-shaped cross-section, and disposed in a position adjacent to the oil seal 10; a conical circumferential surface 15 formed on the portion of the bearing 5 which is on the side of the oil seal with the check valve lip 12 resiliently contacting the conical circumferential surface 15 to form an inner hollow chamber 16 on the side of the rod 4 and an outer hollow chamber 17 on the side of the oil seal cover 9; a coiled spring 18 disposed in the outer hollow chamber 17 and adapted to urge the check valve 11 toward the oil seal 10; and a communication bore 19 formed suitably in the vicinity of the outer circumferential surface of the bearing 5 so as to communicate the outer hollow chamber 17 with the gas chamber 3.

When the piston and rod 4 in the above shock absorber are moved upward, the pressure in the oil chamber 6 increases, so that a part of the oil flows into the inner hollow chamber 16 through a clearance between the bearing 5 and rod 4. At this time, the oil seal 10 prevents the oil from leaking outside. Consequently, the check valve lip 12 is expanded, so that the oil flows into the outer hollow chamber 17. The oil then flows through the communication bore 19 into the gas chamber 3 to be mixed with the oil existing in a lower portion thereof. When the piston and rod 4 are moved downward, the pressure in the oil chamber 6 decreases, and the lip 12 of the check valve 11 is brought into press contact with the conical circumferential surface of the bearing 5. Accordingly, the pressure gas in the gas chamber 3 and outer hollow chamber 17 is prevented from flowing into the inner hollow chamber 16.

In the above shock absorber, the oil seal 10 and check valve 11 are supported on the coiled spring 18. Therefore, the actions of the oil seal 10, which is drawn downward due to the friction between the rod 4 and oil seal 10, especially, during a downward stroke of the rod 4, have influence on the contacting condition of the check valve lip 12 and the conical circumferential surface 15 of the bearing 5. There is the possibility in such a shock absorber that the pressure gas in the gas chamber 3 leaks into the inner hollow chamber 16 and flows into the oil chamber 6 to be mixed with the oil, or to leak outside through the sliding portions of the oil seal 10 and rod 4.

SUMMARY OF THE INVENTION

An object of the present invention is to provide a shock absorber, which is free from the drawbacks encountered in the above-described prior art shock absorber, and which is provided with stably-supported oil seal and check valve lip.

In order to achieve the above object, a shock absorber according to the present invention is constructed as follows. A bearing, which supports a reciprocatingly-movable rod, is provided at a radially intermediate portion thereof with a cylindrical support portion extending in the axial direction thereof, and a main lip, which is adapted to sealingly slide on a circumferential surface of the rod and prevent an oil from leaking outside and the external dust from entering the interior of the shock absorber, and a check valve lip resiliently contacting an outer circumferential surface of the cylindrical support portion are fixed unitarily to a reinforcing member of a metal sheet to form an oil seal, which is joined to a gas tube as a radially extending portion thereof, which is formed between the main lip and check valve lip, is supported at an inner surface thereof on an end surface of the cylindrical support portion. The oil seal and gas tube are joined together by fitting the oil seal in an oil seal cover, which is formed independently thereof so as to have a cylindrical portion and an inwardly-extending flange portion, and which has a substantially L-shaped longitudinal section, to support the radially-extending portion of the oil seal, which is formed between the main lip and check valve lip thereof, on the end surface of the cylindrical support portion of the bearing, and join the cylindrical portion of the oil seal cover to an end portion of the gas tube, or sandwiching an outer circumferential end portion of the oil seal between an outer end portion of the bearing and a bent end portion of the gas tube. The cylindrical support portion extending from bearing is provided in the end surface thereof with grooves for communicating the inside and outside thereof with each other.

The above and other objects as well as advantageous features of the invention will become apparent from the following description of the preferred embodiments taken in conjunction with the accompanying drawings.

DESCRIPTION OF THE PREFERRED EMBODIMENTS

Figure 1:
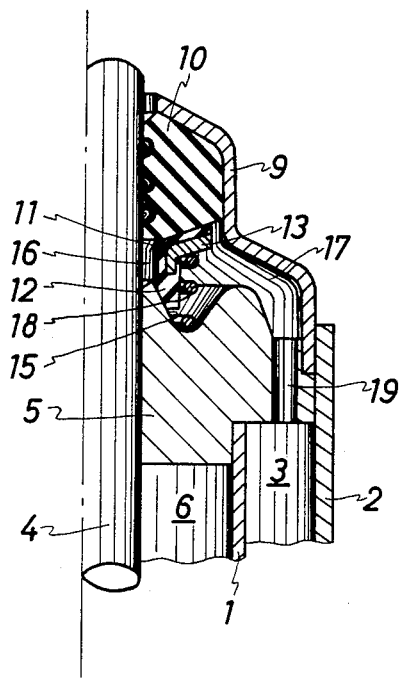
FIG. 1 is a sectional view of an example of a prior art shock absorber.
Figure 2:
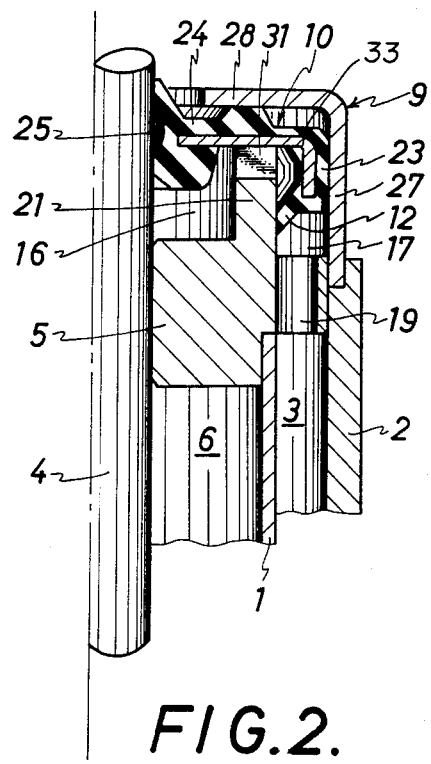
FIG. 2 is a sectional view of an embodiment of the present invention.

The embodiments of the shock absorber according to the present invention will now be described with reference to the drawings. In the embodiment shown in FIG. 2, a bearing 5, which is fitted to end portions of an oil cylinder 1 and a gas tube 2 to form a gas chamber 3 between the oil cylinder 1 and gas tube 2, and an oil chamber 6 between the oil cylinder 1 and a rod 4, and which supports the rod 4, is provided with a cylindrical support portion 21 on the opposite side of the oil chamber 6, which support portion 21 extends in the axial direction of the bearing 5. The oil seal 10, reinforced by an annular reinforcing member 33 of a substantially L-shaped longitudinally section, has a substantially cylindrical fixing portion 23 formed at a radially outer section thereof, a bull's eye type radially-extending portion 24, a main lip 25 sealingly sliding on a circumferential surface of the rod 4, and a check valve lip 12 extending inward in the diagonal direction from a lower end of the cylindrical fixing portion 23 and having a substantially frusto-conical shape. The oil seal 10 is fitted in a cylindrical portion 27 of an oil seal cover 9, which has the cylindrical portion 27 and an inwardly extending flange portion 28, and which is formed to have a substantially L-shaped longitudinal section and joined to the end portion of the gas tube 2. The radially-extending portion 24 reinforced by the annular reinforcing member 33 is held between the cylindrical support portion 21 of the bearing 5 and the inwardly-extending flange portion 28 of the oil seal cover 9 with the check valve lip 12 resiliently contacting the outer circumferential surface of the cylindrical support portion 21. The cylindrical support portion 21 of the bearing 5 is provided in the end section thereof with communication grooves 31 for communicating the inside and outside of the bearing 5 with each other. A communication bore 19 is provided in the vicinity of the outer circumferential surface of the bearing 5 so as to communicate an outer hollow chamber 17, which is formed on the outer side of the check valve lip 12, and the gas chamber 3 with each other.

Figure 3:
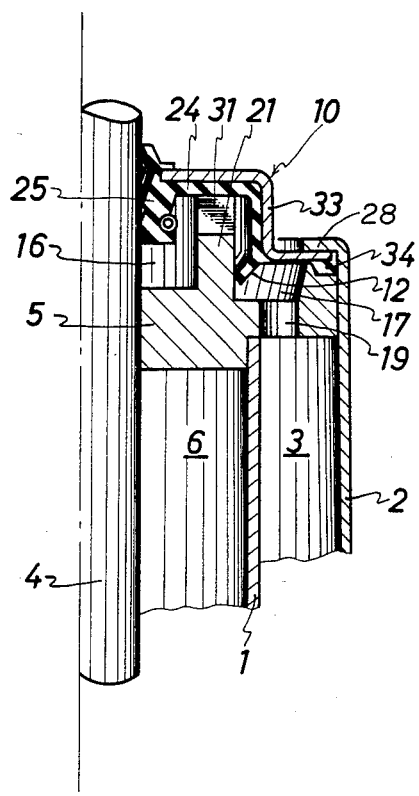
FIG. 3 is a sectional view of another embodiment of the present invention.

In another embodiment of the present invention shown in FIG. 3, a bearing 5, which is fitted to end portion of an oil cylinder 1 and a gas tube 2 to form a gas chamber 3 between the oil cylinder 1 and gas tube 2, and an oil chamber 6 between the oil cylinder 1 and a rod 4, and which supports the rod 4, is provided with a cylindrical support portion 21 on the opposite side of the oil chamber 6, which support portion 21 extends in the axial direction of the bearing 5. An oil seal 10 is reinforced by an annular reinforcing member 33 consisting of a metal sheet and having a substantially Z-shaped longitudinal section. The oil seal 10 is made of a rubber-like elastic material, and consists of a main lip 25, a substantially frusto-conical check valve lip 12, and a sealing and fixing portion 34, which is provided at an outer circumferential end of the oil seal 10. The sealing and fixing portion 34 is inserted into an annular groove provided in an outer circumferential end portion of the bearing 5, and an end portion of the gas tube 2 is bent to form an inwardly-extending flange portion 28 in order to fix the sealing and fixing portion 34, reinforced by the annular reinforcing member 33 thereto. Thus, the main lip 25 is brought into resilient contact with a circumferential surface of the rod 4, and the check valve lip 12 with the circumferential surface of the cylindrical support portion 21, respectively, to form inner and outer hollow chambers 16, 17 between the oil seal 10 and bearing 5. A radially-extending portion 24, which is formed between the main lip 25 and check valve lip 12, contacts at its inner surface the end surface of the cylindrical support portion 21. The cylindrical support portion 21 is provided in its end portion with communication grooves 31, and communication bores 19 opened into the gas chamber 3 are provided in the vicinity of an outer end portion of the bearing 5.

During an upward stroke of the rod 4 in the shock absorber according to the present invention constructed as described above, the oil flowing out to the side of the oil seal 10 through a clearance between the bearing 5 and rod 4 is prevented from leaking outside by the main lip 25. The oil thereby flows through the communication grooves 31 to reach the check valve lip 12 and expand the same. Consequently, the oil flows into the gas chamber 3 through the outer hollow chamber 17 and communication bores 19. During a downward stroke of the rod 4, the pressures in the inner hollow chamber 16 and oil chamber 6 decrease, so that the check valve lip 12 is brought into press contact with the circumferential surface of the cylindrical support portion 21. Accordingly, the pressure gas can be prevented from flowing out to the side of the inner hollow chamber 16.

The shock absorber according to the present invention having the above-mentioned construction permits obtaining the following effects. A bearing adapted to guide a reciprocatingly movable rod is provided with a cylindrical support portion, and an oil seal has a main lip, which is adapted to slide on a circumferential surface of the rod and prevent the leakage of an oil, and a check valve lip contacting a circumferential surface of the cylindrical support portion. The oil seal is held at its reinforced portion between the bearing and the inwardly-extending flange portion provided at the end portion of the gas tube with an intermediate portion between the main lip and check valve lip contacting the cylindrical support portion. Therefore, the oil seal can be maintained in a firmly-held state. There is no possibility at all that the reciprocating movements of the rod will adversely affect the sealing functions of the main lip or check valve lip. Since the bearing is provided with the cylindrical support portion, an oil reservoir is formed in an inner hollow chamber, so that the bearing and main lip can be kept in an excellently-lubricated state with respect to the reciprocating movements of the rod.

The present invention is not, of course, limited to the above embodiments; it may be modified in various ways within the scope of the appended claims.

What is claimed is:

1. A shock absorber comprising an oil cylinder 1 and a gas tube 2, which are jointed together in a concentrically-arranged state to form a gas chamber 3 therebetween; a rod 4 moved reciprocatingly in said oil cylinder 1; and a bearing 5 having an axially extending cylindrical support portion 21, fixed to an end portion of said oil cylinder 1, forming an oil chamber 6 in cooperation with said oil cylinder 1 and said rod 4, said axially extending cylindrical support portion 21 having a communication groove 31 and supporting said rod 4 in such a manner that said rod 4 can be slidingly moved; and an oil seal 10 reinforced by an annular reinforcing member 33, which has a main lip 25 sealingly slidable with respect to a circumferential surface of said rod 4, and a check valve lip 12 having substantially frusto-concial shape, resiliently contracting an outer circumferential surface of said cylindrical support portion 21, and adapted to allow an oil to flow from said oil chamber 6 to said gas chamber 3, and prevent a gas from flowing in the opposite direction, and whose reinforced portion is firmly held between said bearing 5 and inwardly-extending flange portion 28 provided at the end portion of said gas tube 2 as a radially-extending portion 24, with which said main lip 25 and said check valve lip 12 are connected integrally with each other, is supported on said cylindrical support portion 21.

2. A shock absorber according to claim 1, wherein said oil seal 10 is fitted in an oil seal cover 9 having a cylindrical portion 27 and said inwardly extending flange portion 28 and joined at said cylindrical portion 27 to said gas tube 2 so as to firmly hold said oil seal 10 between said inwardly-extending flange portion 28 and said cylindrical support portion 21.

3. A shock absorber according to claim 1, wherein said oil seal 10 has a fixing portion 34 at an outer circumferential end thereof, which fixing portion 34 is firmly sandwiched between said inwardly-extending flange portion 28 of said gas tube 2 and said bearing 5.

* * * * *